United States Patent
Nguyen et al.

(12) United States Patent (10) Patent No.: US 7,117,482 B2
Nguyen et al. (45) Date of Patent: Oct. 3, 2006

(54) MIGRATION OF CONFIGURATION DATA FROM ONE SOFTWARE INSTALLATION THROUGH AN UPGRADE

(75) Inventors: Tram B. Nguyen, San Jose, CA (US); Donald Molaro, Sunnyvale, CA (US)

(73) Assignees: Sony Corporation, Tokyo (JP); Sony Electronics Inc., San Diego, CA (US)

( * ) Notice: Subject to any disclaimer, the term of this patent is extended or adjusted under 35 U.S.C. 154(b) by 640 days.

(21) Appl. No.: 10/402,074

(22) Filed: Mar. 26, 2003

(65) Prior Publication Data

US 2004/0194079 A1 Sep. 30, 2004

(51) Int. Cl.
G06F 9/44 (2006.01)
(52) U.S. Cl. .................. 717/122; 717/121; 717/170
(58) Field of Classification Search ........ 717/120–122, 717/169–172, 175–176
See application file for complete search history.

(56) References Cited

U.S. PATENT DOCUMENTS

| | | | | |
|---|---|---|---|---|
| 5,666,293 | A * | 9/1997 | Metz et al. ................. | 709/220 |
| 6,259,442 | B1 * | 7/2001 | Britt et al. ................. | 715/721 |
| 6,483,746 | B1 * | 11/2002 | Haraguchi et al. ..... | 365/185.08 |
| 6,895,463 | B1 * | 5/2005 | Oga et al. ................. | 711/103 |
| 6,904,611 | B1 * | 6/2005 | Poli et al. ................. | 725/132 |

OTHER PUBLICATIONS

Baker et al., "Non-Volatile Memory for Fast, Reliable File Systems", ACM, pp. 10-22, 1992.*
Marsh et al, "Flash Memory File Caching for Mobile computers", IEEE, pp. 451-460, 1994.*

* cited by examiner

*Primary Examiner*—Ted T. Vo
(74) *Attorney, Agent, or Firm*—Haverstock & Owens LLP

(57) ABSTRACT

Setting parameter values are migrated through a new software upgrade. Each software version includes a version number. The version number of the new software is compared to a version number of the current software. The version number of the current software is determined by reading a version number parameter value stored in a non-volatile random access memory (NVRAM). If the version number of the new software is higher than the version number of the current software, for each setting parameter value within a new map file, either a current setting parameter value stored in the NVRAM or a default value from the map file, is loaded into a temporary memory. The map file, corresponding to the current version number parameter value stored in the NVRAM, is used to associate the values in the NVRAM to their corresponding setting parameters. Once a value for each setting parameter is loaded into the temporary memory, the values from the temporary memory are then loaded into the NVRAM.

36 Claims, 9 Drawing Sheets

MIGRATION OF CONFIGURATION DATA FROM ONE SOFTWARE INSTALLATION THROUGH AN UPGRADE

FIELD OF THE INVENTION

The present invention relates to the field of software upgrades. More particularly, the present invention relates to the field of migration of configuration data from one software installation through an upgrade.

BACKGROUND OF THE INVENTION

When current versions of many of today's applications software or operating software are upgraded, existing user settings are lost during the upgrade process. User settings in place prior to the software upgrade are replaced by default settings associated with setting parameters of the new software version.

Set-top boxes are often used as intermediary devices between a content source such as a personal computer or a remote cable television provider, and a display device such as a television. Often, set-top boxes allow users to adjust control settings such as tint, brightness and color, using an operating software within the set-top box. The adjusted control settings can subsequently be saved within a system memory of the set-top box. When the control software for the set-top box is upgraded, new control setting parameters with associated default settings are typically included within the new upgraded software. These new control setting parameters and associated default values replace the previous control setting parameters and any user adjusted values associated with them.

SUMMARY OF THE INVENTION

The present invention provides for migration of setting parameter values through a new software upgrade. When generated, the source code for each software upgrade includes a layout file having a representation of the parameters for which settings are possible. This representation preferably includes the parameters, the type of the parameter and a default value for the parameter. From this layout file, a computer program is preferably utilized to automatically generate a map file representing the parameters and to also generate software code used to access the parameter values once they are stored in a device. The map file and this access code are then included within the software which is loaded into system memory of the device. The map file includes a version number corresponding to the version number of the software. Each software version preferably includes the current map file as well as all map files from previous versions.

Each software version includes a version number. The version number of the new software is determined by determining the greatest version number of the map files within the new software. The version number of the new software is compared to a version number of the current software. The version number of the current software is determined by reading a version number parameter value stored in a non-volatile random access memory (NVRAM). If the version number of the new software is higher than the version number of the current software, current setting parameter values stored in the NVRAM are migrated, as appropriate, to the locations within the NVRAM corresponding to the new software, utilizing the map files. The map files are utilized to determine the appropriate values for the parameters in the new software from the current values of the parameters, if available, in the NVRAM. For each parameter included in the new map file, it is determined if there is a corresponding value currently stored in the NVRAM. If there is a corresponding value stored in the NVRAM, then that value is stored in a temporary memory corresponding to the parameter. If there is not a corresponding value stored in the NVRAM, then the default value for the parameter is stored in the temporary memory at a location corresponding to the parameter. Once all the corresponding values for all of the parameters have been loaded in the temporary memory, then the parameters and their corresponding values are all written in the NVRAM in locations specified by the new map file.

In one aspect of the present invention a method of migrating current setting parameter values through a software upgrade comprises storing current setting parameter values and a current version number parameter value of a current software version in a non-volatile memory, loading a new software version into a system memory, wherein the new software version includes a new version number parameter value, new setting parameters, and default new setting parameter values, for each of the new setting parameters, storing in the non-volatile memory, the current setting parameter value, if available and for each of the new setting parameters for which a current setting parameter value is not available, storing a corresponding default new setting parameter value in the non-volatile memory. The system memory includes a map file which includes setting parameters, setting parameter values, version number parameter, and version number parameter value. The method further comprises generating and storing the map file based on a layout file such that the map file is identified by the version number parameter value in the layout file, wherein the map file includes each setting parameter stored in the layout file and an associated address within the non-volatile memory in which the corresponding setting parameter value is located. The method further comprises comparing the new version number parameter value and the current version number parameter value to determine which version number parameter value is higher. If the new version number parameter value is greater than the current version number parameter value, then the method further comprises identifying the map file corresponding to the current version number parameter value stored in the non-volatile memory, and associating the setting parameters within the identified map file with the corresponding setting parameter values stored in the non-volatile memory according to the identified map file. The method further comprises for each of the new setting parameters, storing in a temporary memory, the current setting parameter value, if available, or the corresponding default new setting parameter value. The method further comprises determining if the new version number parameter value is higher than the current version number parameter value.

In a another aspect of the present invention, a device for migrating current setting parameter values through a software upgrade comprises means for storing current setting parameter values and a current version number parameter value of a current software version in a non-volatile memory, means for loading a new software version into a system memory, wherein the new software version includes a new version number parameter value, new setting parameters, and default new setting parameter values and means for controlling for storing in the non-volatile memory for each of the new setting parameters, the current setting parameter value, if available, and for each of the new setting parameters for which a current setting parameter value is not available, storing a corresponding default new setting parameter value in the non-volatile memory. The system memory includes a map file which includes setting parameters, setting parameter values, version number parameter, and version number parameter value. The device further comprises means for generating and storing the map file based on a layout file such that the map file is identified by the version number parameter value in the layout file, wherein the map file includes each setting parameter stored in the layout file and an associated address within the non-volatile memory in which the corresponding setting parameter value is located. The device further comprises means for comparing the new version number parameter value and the current version number parameter value to determine which version number parameter value is greater. If the new version number parameter value is greater than the current version number parameter value, then the means for controlling further identifies the map file corresponding to the current version number parameter value stored in the non-volatile memory, and associates the setting parameters within the identified map file with the corresponding setting parameter values stored in the non-volatile memory according to the identified map file. The means for controlling only stores the current setting parameter value or the default new setting parameter value in the non-volatile memory if the new version number parameter value is greater than the current version number parameter value. The device further comprises temporary means for storing coupled to the means for controlling for storing in a temporary memory, for each of the new setting parameters, the current setting parameter value, if available, or the corresponding default new setting parameter value.

In a further aspect of the present invention, a device including a software version comprises a system memory to store a current software version, wherein the current software version includes one or more adjustable current setting parameters, current setting parameter values, a version number parameter, and a current version number parameter value, a non-volatile memory including the current version number parameter value and the current setting parameter values loaded in the system memory and a controller to overwrite the current software version in the system memory with a new software version, wherein the new software version includes one or more adjustable new setting parameters, default values for the new setting parameters, the version number parameter, and a new version number parameter value, and to store in the non-volatile memory for each of the new setting parameters, the current setting parameter value, if available, and for each of the new setting parameters for which a current setting parameter value is not available, storing a corresponding default new setting parameter value in the non-volatile memory. Each software version further comprises a new map file, wherein the new map file stores the setting parameters, the setting parameter values, the version number parameter, and the version number parameter value currently residing within the system memory. The map file includes each setting parameter and an associated address within the non-volatile memory in which the corresponding setting parameter value is located. The device further comprises an interface to receive the new software version and to send the new software version to the system memory. The device further comprises a decoder to receive secured content from an external content source via the interface, to decode the secured content, and to send the decoded content to a display device. The content is audio, video and image data. The comprises a set-top box. The system memory comprises flash memory. The non-volatile memory comprises non-volatile random access memory.

In still a further aspect of the present invention, a method of migrating current setting parameter values through a software upgrade comprises storing current setting parameter values and a current version number parameter value of a current software version in a non-volatile memory, loading a new software version into a system memory, wherein the new software version includes a new version number parameter value, new setting parameters, and default new setting parameter values, for each of the new setting parameters, storing in a temporary memory, the current setting parameter value, if available, for each of the new setting parameters for which a current setting parameter value is not available, storing a corresponding default new setting parameter value in the temporary memory and storing the current setting parameter values and the default new setting parameter values from the temporary memory in the non-volatile memory. The system memory includes a map file which includes setting parameters, setting parameter values, version number parameter and version number parameter value. The method further comprises generating and storing the map file based on a layout file such that the map file is identified by the version number parameter value in the layout file, wherein the map file includes each setting parameter stored in the layout file and an associated address within the non-volatile memory in which the corresponding setting parameter value is located. The method further comprises comparing the new version number parameter value and the current version number parameter value to determine which version number parameter is higher. If the new version number parameter value is greater than the current version number parameter value, then the method further comprises identifying the map file corresponding to the current version number parameter value stored in the non-volatile memory, and associating the setting parameters within the identified map file with the corresponding setting parameter values stored in the non-volatile memory according to the identified map file.

In a further aspect of the present invention, a device to migrate current setting parameter values through a software upgrade comprises a non-volatile memory to store current setting parameter values and a current version number parameter value of a current software version, an upgrade interface to load a new software version into a system memory, wherein the new software version includes a new version number parameter value, new setting parameters and default new setting parameter values and a control circuit to store in the non-volatile memory for each of the new setting parameters, the current setting parameter value, if available, and for each of the new setting parameters for which a current setting parameter value is not available, to store a corresponding default new setting parameter value in the non-volatile memory. The system memory includes a map file which includes setting parameters, setting parameter values, version number parameter and version number parameter value. The device further comprises a generation circuit to generate and store the map file based on a layout file such that the map file is identified by the version number parameter value in the layout file, wherein the map file includes each setting parameter stored in the layout file and an associated address within the non-volatile memory in which the corresponding setting parameter value is located. The device further comprises a comparator circuit to compare the new version number parameter value and the current version number parameter value to determine which version number parameter value is greater. If the new version number parameter value is greater than the current version number parameter value, then the control circuit further identifies the map file corresponding to the current version number parameter value stored in the non-volatile memory, and associates the setting parameters within the identified map file with the corresponding setting parameter values stored in the non-volatile memory according to the identified map file. The control circuit only stores the current setting parameter value or the default new setting parameter value in the non-volatile memory if the new version number parameter value is greater than the current version number parameter value. The device further comprises a temporary memory coupled to the control circuit to store in the temporary memory, for each of the new setting parameters, the current setting parameter value, if available, or the corresponding default new setting parameter value.

DETAILED DESCRIPTION OF THE EMBODIMENTS

Figure 1:
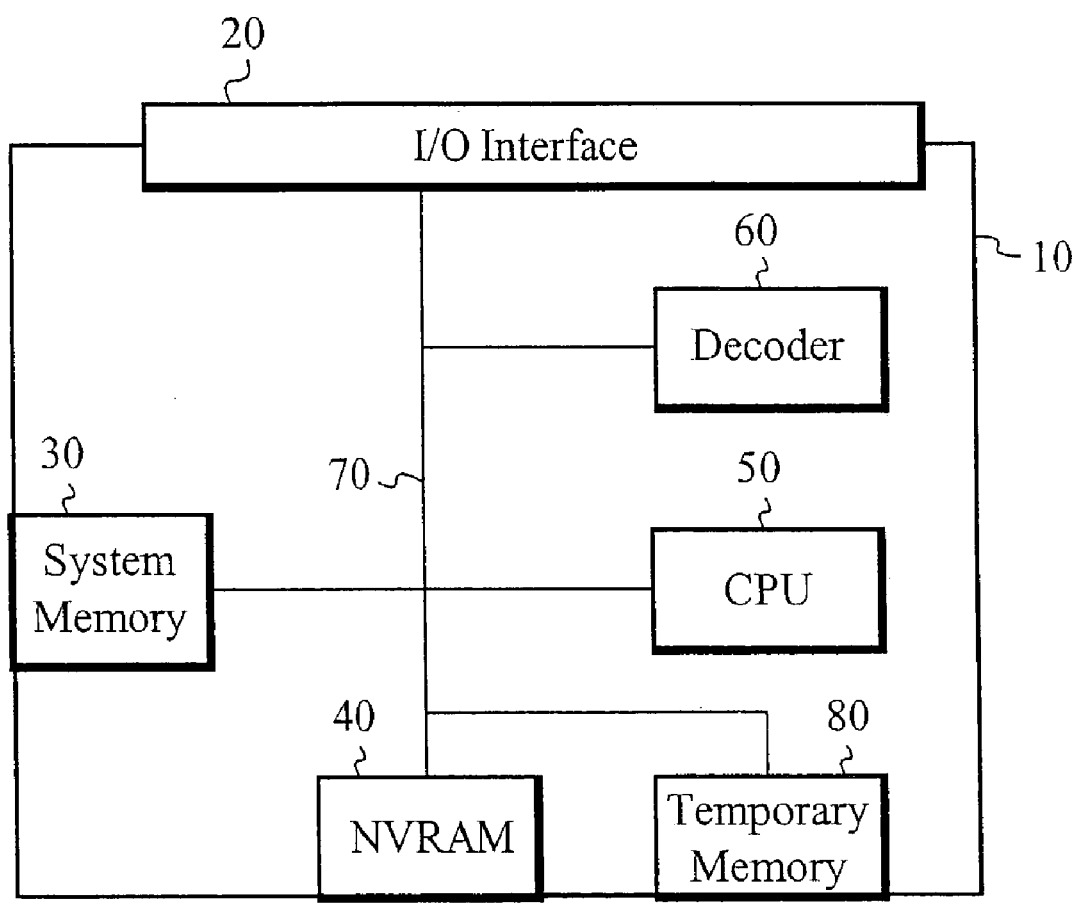
FIG. 1 illustrates an exemplary set-top box.

Embodiments of the present invention provide for migration of configuration data from a current software installation through one or more software upgrades. Preferably, the software provides control and operation functionality to a set-top box. The set-top box preferably controls the transmission of multimedia from a local storage device such as a personal computer (PC) to a television. The software is stored in a system memory, preferably flash memory, and includes one or more map files. The map files each include configuration data that provides setting parameters and associated values used by the set-top box, as well as a version number parameter. The value of the version number parameter indicates the version number of the corresponding software. The map file includes the setting parameters and an address corresponding to a location of each setting parameter value. The data in the map file is used to write each setting parameter value into a designated address of a non-volatile random access memory (NVRAM). The version number value is also stored in a designated address within the NVRAM in a similar manner.

A user can change the value of a setting parameter, and the changed value is saved in the NVRAM. Using the map file, during an upgrade of the software, this changed value of the parameter is preserved through the upgrade.

The source code for each software upgrade preferably includes a layout file having a representation of the parameters for which settings are possible. For each parameter, this representation preferably includes the parameter, the type of the parameter and a default value for the parameter. From this layout file, a computer program is preferably utilized to automatically generate a map file representing the parameters and their location within the NVRAM. The computer program is also utilized to generate software code used to access the parameter values once they are stored within the NVRAM in a device. The map file and this access software code are then included within the software that is loaded onto the device. The map file includes a version number corresponding to the version number of the software. Each software version preferably includes the current map file as well as all map files from previous versions.

When an upgrade of the software is initiated, the new software upgrade includes a new version number value. The version number is determined by determining the greatest version number of the map files within the new software. During the upgrade, the new software's version number value is compared to the current version number value stored in NVRAM. If the new version number value of the software upgrade is "higher" than the current version number value currently stored in NVRAM, a process is followed to allow the existing configuration data to persist through the software upgrade. The process includes migrating current setting parameter values, as appropriate, from the NVRAM to a temporary memory and then back to the NVRAM in order to preserve the values through the software upgrade. After the upgrade, the NVRAM includes the new version number value and new setting parameters available to the new software upgrade. The new setting parameters can be identical to the setting parameters of the previous upgrade, can include a subset of the previous setting parameters, and can include additional parameters different than the setting parameters of the previous software upgrade.

The new map file is identified by the version number value included within the new map file. The new version number value is then compared to the current version number value stored in NVRAM. If the new version number value is higher, then the current version number stored in NVRAM is used to retrieve the current map file from the software. Using the retrieved current map file, the setting parameter values stored in NVRAM are associated to their corresponding setting parameters. Once the corresponding setting parameters are identified, those setting parameters are matched to any identical new setting parameters found in the new map file. For each parameter included in the new map file, it is determined if there is a corresponding value currently stored in the NVRAM. If there is a corresponding value stored in the NVRAM, then that value is stored in a temporary memory at a location corresponding to the parameter. If there is not a corresponding value stored in the NVRAM, then the default value for the parameter is stored in the temporary memory at a location corresponding to the parameter. Once all the corresponding values for all of the parameters have been loaded in the temporary memory, then the corresponding values are all written in the NVRAM in locations specified by the new map file as corresponding to the parameters. The current setting parameter values for any corresponding new setting parameters of the software upgrade are then included in the NVRAM. In this manner, all new setting parameter values and the new version number value are mapped by the new map file into the NVRAM. The NVRAM now includes the new setting parameter values and the new version number value.

FIG. 1 illustrates an exemplary set-top box according to the present invention. The set-top box preferably controls the transmission of multimedia from a local storage device such as a personal computer (PC) to a television. The set-top box 10 includes an input/output (I/O) interface 20, a system memory 30, a non-volatile random access memory (NVRAM) 40, a central processing unit (CPU) 50, a decoder 60 and a temporary memory buffer 80, all coupled via a bi-directional bus 70. The I/O interface 20 preferably couples the set-top box 10 to the PC (not shown) for receiving multimedia and for receiving new software upgrades, and to the television (not shown) or other display device for displaying the multimedia received from the PC. The I/O interface 20 also sends and receives control signals to and from the PC and the television. It should be clear to those skilled in the art that alternatively, the set-top box 10 can be coupled to a device different than a PC for receiving multimedia and for receiving software upgrades.

The system memory 30 stores the software used to enable operation of the set-top box 10. Preferably, the system memory 30 is flash memory. Alternatively, any conventional type of memory can be used. The NVRAM 40 stores setting parameter values associated with the operation of the set-top box 10. The NVRAM 40 also stores a current version number value associated with the version number of the software currently used to operate the set-top box 10. Multimedia received by the set-top box 10 is preferably encrypted to prevent unauthorized access and use, and the decoder 60 decrypts the multimedia according to access authorization provided by the CPU 50. The temporary memory 80 is used to store settings corresponding to parameters during an upgrade, as will be described in detail below.

Figure 2A:
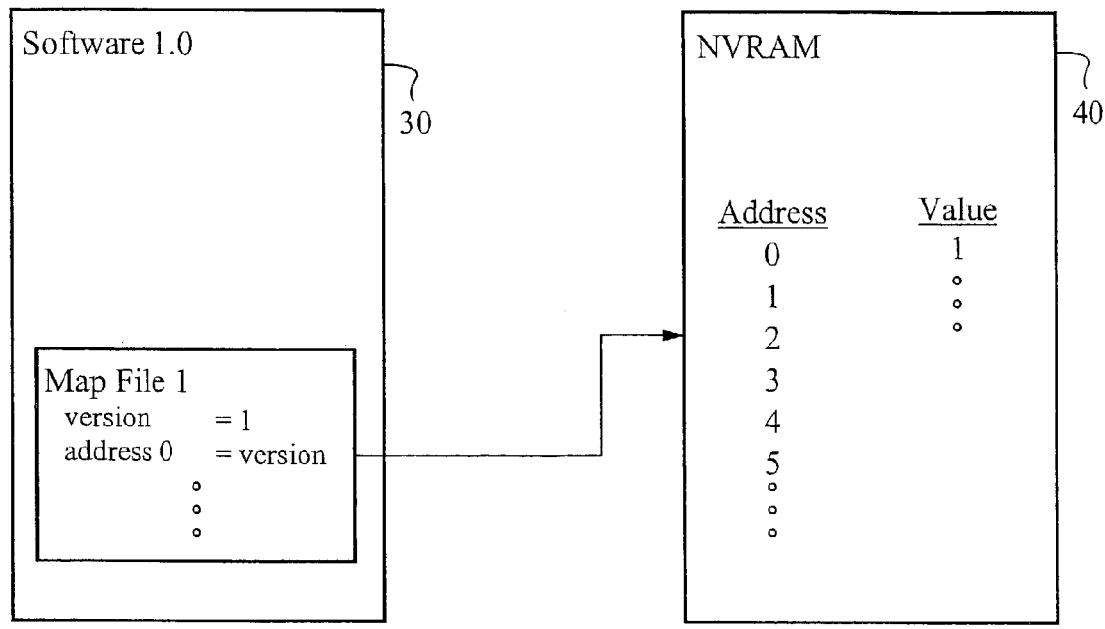
FIG. 2A illustrates current software files and setting parameters before a software upgrade.

FIG. 2A illustrates an exemplary operating software in system memory and associated setting parameter values in non-volatile random access memory before a software upgrade. As described above, the software resides within the system memory 30. Setting parameter values are stored in the NVRAM 40. Each setting parameter in the appropriate map file preferably includes a type, name, description, and default value attribute. Types are preferably char, short, long, string, and block. The software is preferably initially loaded during the manufacture of the set-top box 10 and the default values for the setting parameters are set at that time. This first version of the software is conventionally referred to as software version 1.0, as illustrated in FIG. 2A. The source code for each software version includes a layout file. From this layout file, the map file and the access software code is generated, as described above. The map file includes a version number parameter, the value of which indicates the version number of the associated software. Using the version number parameter value as a reference the map file is referred to as map file 1. In FIG. 2A, the version number parameter has a value equal to one. The map file also includes memory location values for each of the setting parameters associated with the set-top box 10 corresponding to memory locations within the NVRAM 40. Examples of setting parameters include tint, brightness, color and balance. It should be clear to those skilled in the art that other setting parameters can be used. The software loaded into the system memory 30, includes a corresponding map file and preferably also includes a map file corresponding to each previous version of the software. In FIG. 2A, the map file has a version number value of 1. In this manner, the version number parameter is used to identify each map file. Because this is the first version of the software, there are no previous map files included within the software illustrated in FIG. 2A.

The map file associates each setting parameter with a specific address within the NVRAM 40. Preferably, the address of the version number parameter value is a fixed location within NVRAM which does not change from version to version. This location is fixed across all layouts. In the preferred embodiment, the version number parameter location is not repositioned or renamed. The values of the setting parameters are mapped to specific locations within the NVRAM 40 by the map file. In operation, the operating software uses the setting parameter values stored in the NVRAM 40. The NVRAM 40 also stores the setting parameter values for use during an operating software upgrade.

Figure 2B:
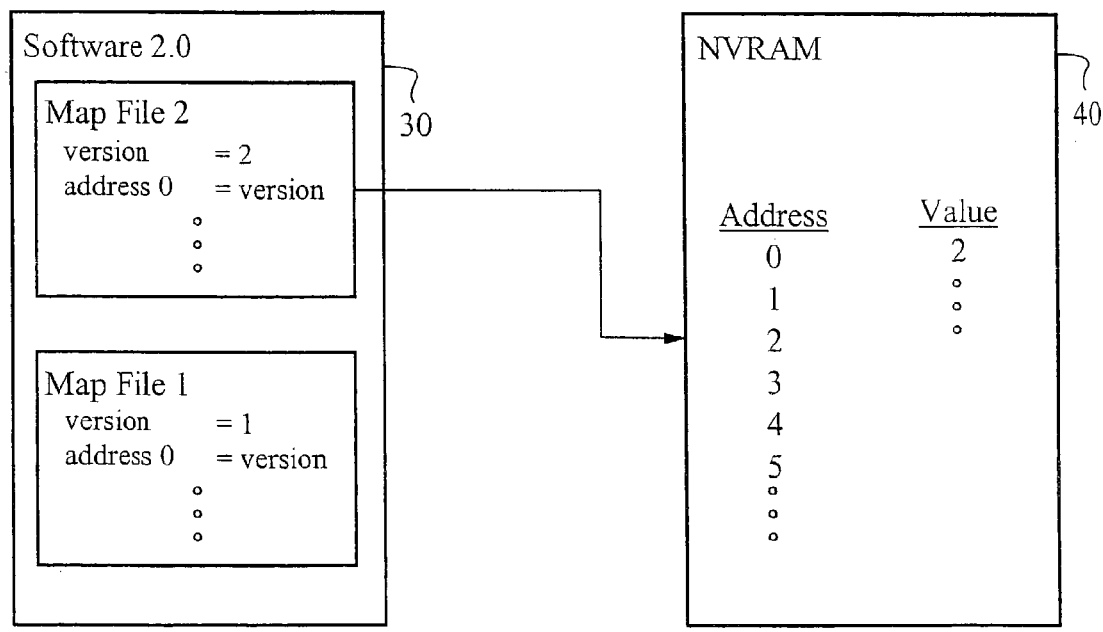
FIG. 2B illustrates new software files and setting parameters after the software upgrade.

FIG. 2B illustrates the exemplary operating software in system memory and setting parameter values in non-volatile random access memory as illustrated in FIG. 2A after a software upgrade. In this case, the version number parameter value is 2. As such, the current map file within the software in system memory 30 is updated to version 2. The map file 2 includes the version number parameter, which in this case has a value of 2, the new setting parameters associated with the software upgrade, and the new (default) setting parameter values. The new setting parameters included in the map file 2 can be the same as the setting parameters defined in the map file 1, or the new setting parameters included in the map file 2 can include additional setting parameters, a combination of additional setting parameters and all or a portion of the setting parameters of map file 1, or in general any combination of new and old setting parameters.

The map file 2 includes a version number parameter value of 2. The map file 2 also associates each new setting parameter with an address in the NVRAM 40. However, before the new setting parameter values are mapped into the NVRAM 40, the operating software 2.0 performs a comparison between the new version number parameter value in the map file 2, which is 2, with the current version number parameter value currently stored in the NVRAM 40, which is 1. If the new version number parameter value in the map file 2 is larger than the current version number parameter value in the NVRAM, then the configuration data and the set values of the setting parameters stored in the NVRAM 40 are migrated to correspond to the new map file, map file 2, and are stored in the NVRAM 40. To correlate the setting parameter values stored in the NVRAM 40 to their corresponding setting parameters in the map file 2, an appropriate map file is used. To determine the appropriate map file, the version number parameter value stored in the NVRAM 40 is matched to a map file with a corresponding version number parameter value in system memory 30. In the example of FIG. 2A, the current version number parameter value is 1, which corresponds to map file 1. Therefore, the map file 1 is used to correlate the values in the NVRAM 40 to their corresponding setting parameters, and then those setting parameters are matched to corresponding setting parameters in the map file 2. For each setting parameter included in the new map file 2, it is determined if there is a corresponding value currently stored in the NVRAM 40. If there is a corresponding value stored in the NVRAM 40, then that value is stored in a temporary memory, at a location corresponding to the parameter. If there is not a corresponding value stored in the NVRAM 40, then the default value for the parameter is stored in the temporary memory, at a location corresponding to the parameter. Preferably, the temporary memory is a buffer in RAM within the settop box 10. Once all the corresponding values for all the parameters have been loaded in the temporary memory, then the setting parameters in the new map file 2 and their corresponding values are all written in the NVRAM 40 in locations specified by the new map file 2. In this manner, the current setting parameter values stored in the NVRAM 40 prior to the software upgrade replace the corresponding default setting parameter values associated with the new software upgrade.

Figure 3A:
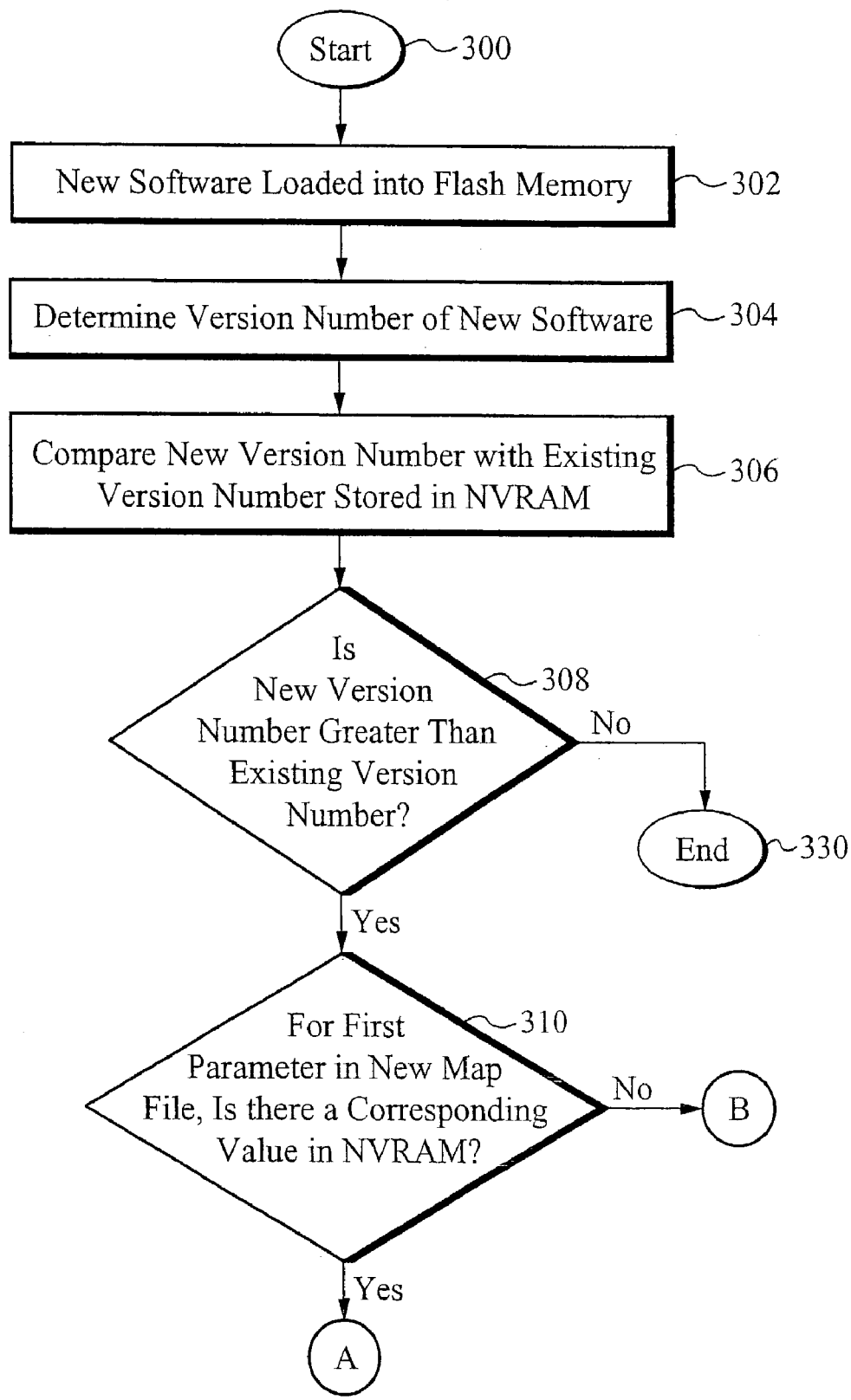
FIGS. 3A and 3B illustrates a method of migrating setting parameter values through a software upgrade according to the preferred embodiment of the present invention.
Figure 3B:
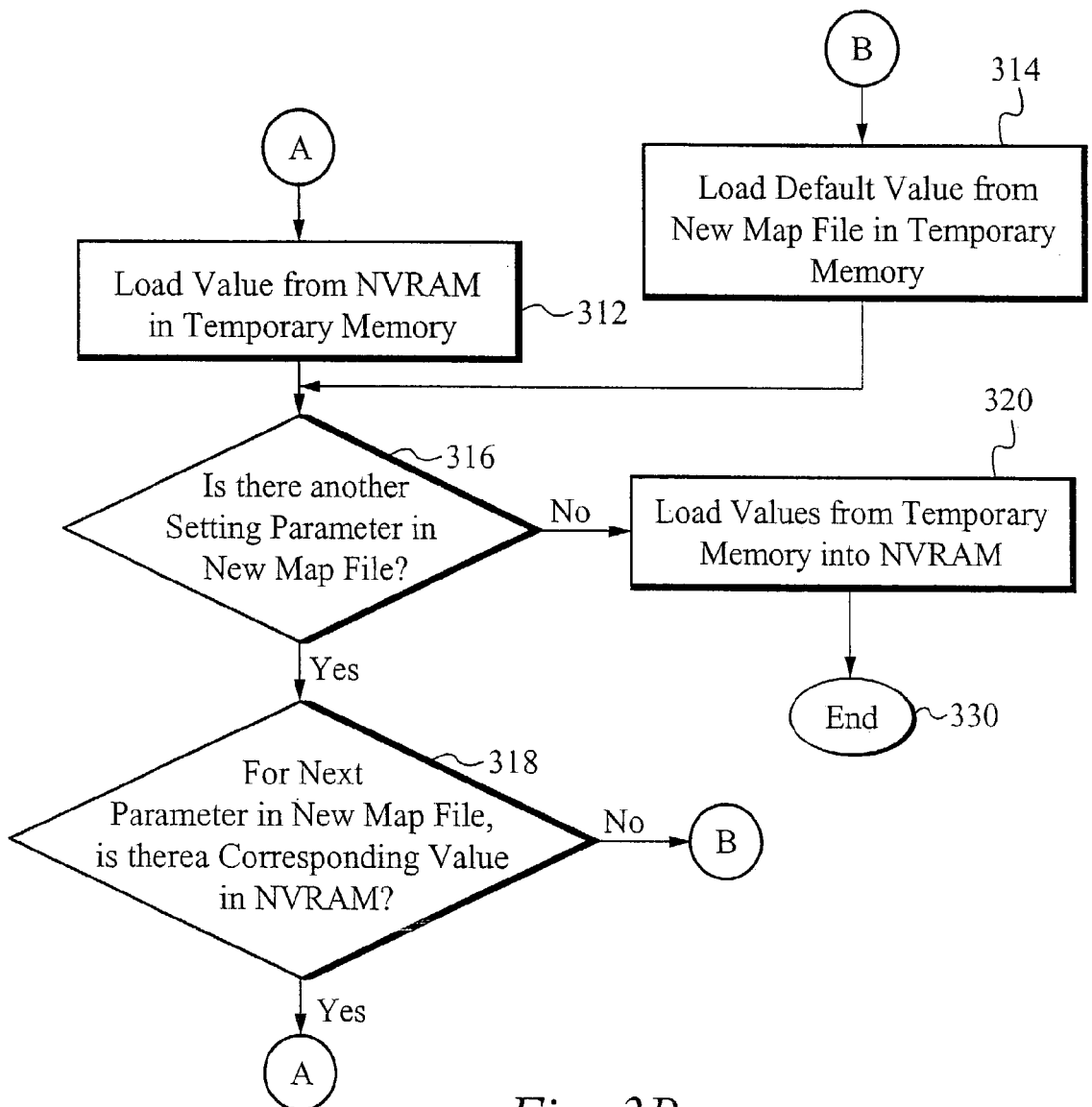

FIGS. 3A and 3B illustrates a method of migrating setting parameter values through a software upgrade according to the preferred embodiment of the present invention. The preferred method begins at the step 300. At the step 302, new software is loaded into flash memory 30 of the set-top box 10. At the step 304, a version number of the new software is determined. The version number is determined by reading a new version number parameter value stored in the newest map file associated with the new software. At the step 306, the version number of the new software is compared to a version number of the current software. The version number of the current software is determined by reading a version number parameter value stored in the NVRAM 40. In the preferred embodiment, the version number parameter value is stored in a fixed location with the NVRAM 40, regardless of which version of software currently operates the set-top box 10. At the step 308, it is determined if the version number of the new software is higher than the version number of the current software. If it is determined at the step 308 that the new version number is not higher than the current version number, then the method ends at the step 330. If it is determined at the step 308 that the new version number is higher than the current version number, then at the step 310, it is determined if for the first setting parameter in the new map file, there is a corresponding value in the NVRAM 40. It is determined if there is a corresponding value in the NVRAM 40 for the first setting parameter using the map file having the same version number as the version number currently stored in the NVRAM 40. If it is determined at the step 310 that there is a corresponding value in the NVRAM 40, then at the step 312, that corresponding value from the NVRAM 40, is loaded into the temporary memory 80 in a location corresponding to the setting parameter. If it is determined at the step 310 that there is not a corresponding value in the NVRAM 40, then at the step 314, the default value for the setting parameter, from the new map file, is loaded into the temporary memory 80 in a location corresponding to the setting parameter. After either the corresponding value from the NVRAM 40, at the step 312, or the default value from the new map file, at the step 314, is loaded into the temporary memory 80, then at the step 316, it is determined if there is another setting parameter in the new map file.

If it is determined at the step 316 that there is another setting parameter in the new map file, then it is determined at the step 318, if there is a corresponding value in the NVRAM 40 for this parameter. If it is determined at the step 318 that there is a corresponding value in the NVRAM 40, then, at the step 312, that corresponding value from the NVRAM 40, is loaded into the temporary memory 80 in a location corresponding to the setting parameter. If it is determined, at the step 318, that there is not a corresponding value in the NVRAM 40, then at the step 314, the default value for the setting parameter, from the new map file, is loaded into the temporary memory 80 in a location corresponding to the setting parameter. After either the corresponding value from the NVRAM 40, at the step 312, or the default value from the new map file, at the step 314, is loaded into the temporary memory 80, then at the step 316, it is determined if there is another setting parameter in the new map file.

This process, through the steps 312, 314, 316 and 318, is repeated for all of the setting parameters within the new map file. Once it is determined, at the step 316, that there are no additional setting parameters within the new map file, then, at the step 320, the values from the temporary memory 80 are loaded into the NVRAM 40. This step includes setting the version number in the NVRAM 40 to correspond to the version number of the new map file. The method then ends at the step 330.

In operation, when a user initiates an upgrade of the software on a set-top box, the new software upgrade includes a new version number. During the upgrade, the new version number is compared to a current version number stored in a non-volatile random access memory (NVRAM). If the new version number of the upgrade software is higher than the current version number stored in NVRAM, then a process is followed to allow the existing setting parameter values to persist through the software upgrade. By way of example, the process by which the existing setting parameters are allowed to persist through the software upgrade is explained in relation to FIGS. 4–8. FIGS. 4–8 illustrate exemplary setting parameters, version number parameter, setting parameter values, and version number parameter values stored within the map files within the software in the system memory 30, the NVRAM 40 and the temporary memory 80 during progressive steps of the upgrade process.

Figure 4:
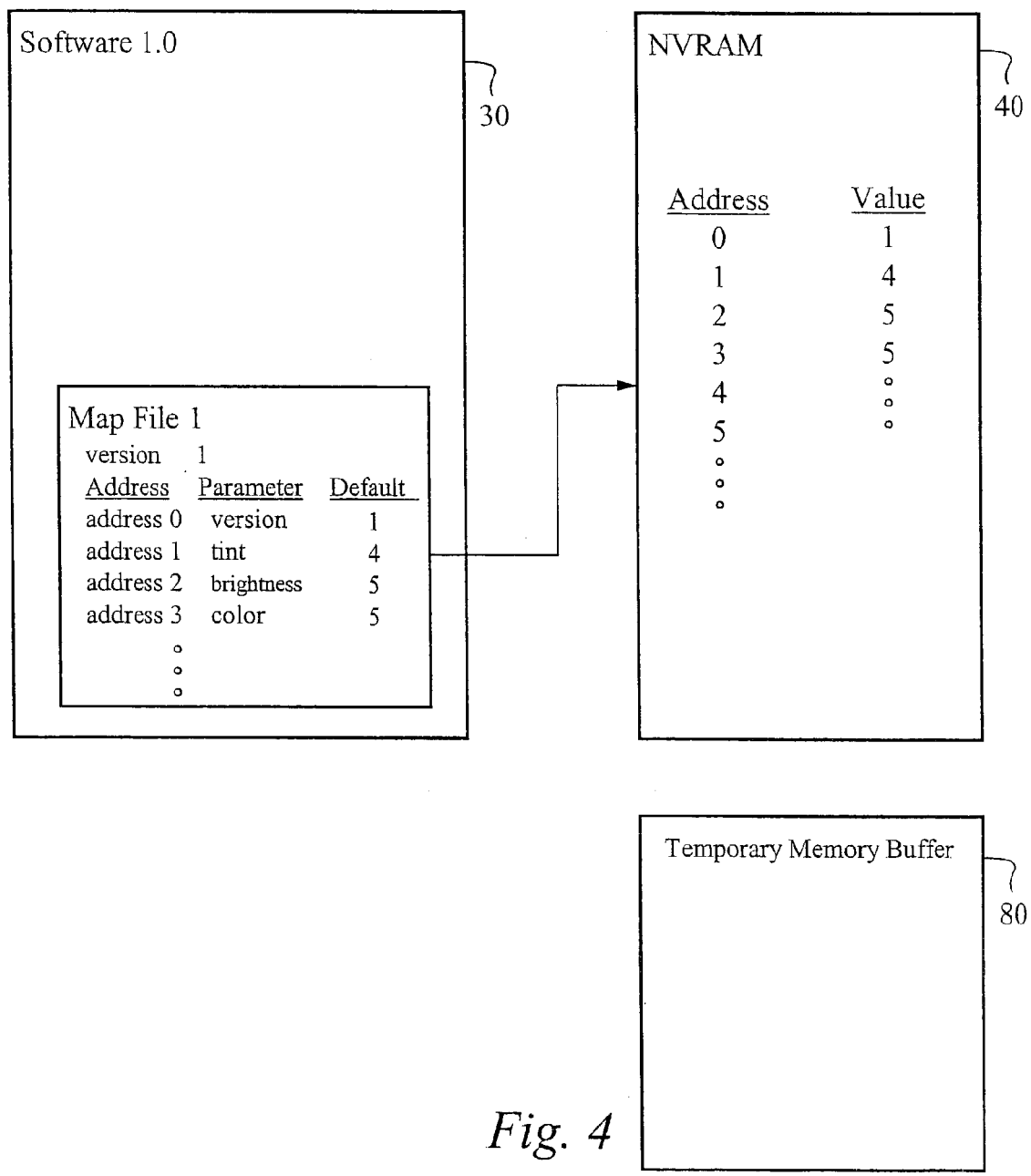
FIG. 4 illustrates a system memory and a non-volatile random access memory (NVRAM) before a software upgrade and current setting parameter values are set at default values.

FIG. 4 illustrates the software within the system memory 30, including the map file 1, and the NVRAM 40 before the software upgrade and the current setting parameter values are set at the default values. An empty temporary buffer 80 is also illustrated in FIG. 4. The setting parameters and their values defined by the map file 1 include tint=4, brightness=5, and color=5. The version number parameter value of the current software is version=1. The map file 1 associates the setting parameters and the version number parameter with the addresses of their respective values stored in the NVRAM 40. Specifically, the map file 1 indicates that the value of the version number parameter is located at address 0, the value of the tint parameter is located at address 1, the value of the brightness parameter is located at address 2, and the value of the color parameter is located at address 3. The NVRAM 40 stores the values of the version number parameter and the setting parameters in the appropriate addresses. As can be seen in FIG. 4, the value stored at address 0 within the NVRAM 40 is 1, the value stored at address 1 is 4, the value stored at address 2 is 5 and the value stored at the address 3 is 5. The values stored in the NVRAM 40 correspond directly to the values of the version number parameter and the setting parameters in the map file 1.

Figure 5:
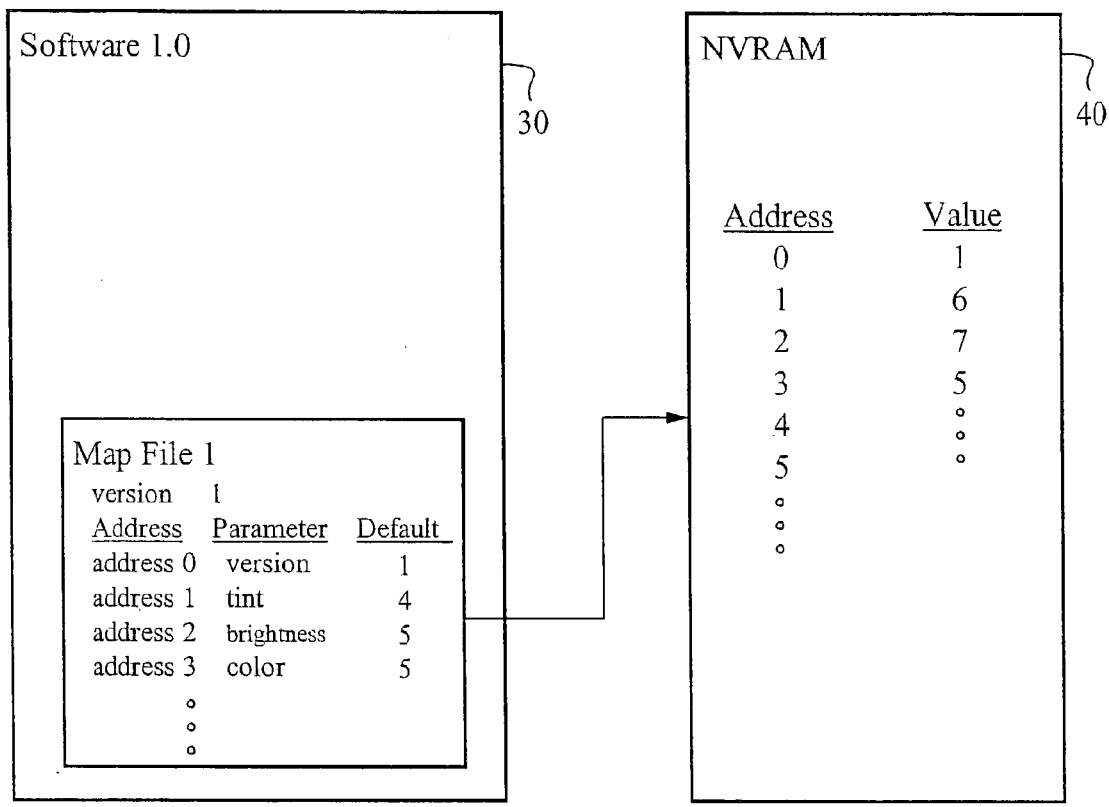
FIG. 5 illustrates the system memory and the NVRAM of FIG. 4 after a user changes the setting parameter values.

FIG. 5 illustrates the system memory 30 and the NVRAM 40 of FIG. 4 after a user changes the tint and brightness settings. Changes made by the user to the setting parameter values are stored in the NVRAM 40. As can be seen in FIG. 5, the tint parameter value at address 1 has been changed to a value of 6 and the brightness parameter value at address 2 has been changed to a value of 7. Using the map file 1, changes made to the setting parameter values are stored in the NVRAM 40. Since address 1 in the NVRAM 40 stores the value of the tint parameter, the value stored at address 1 is changed to 6. Similarly, the value at the address 2 is changed to 7 to correlate with the change of the brightness parameter value to 7.

Figure 6:
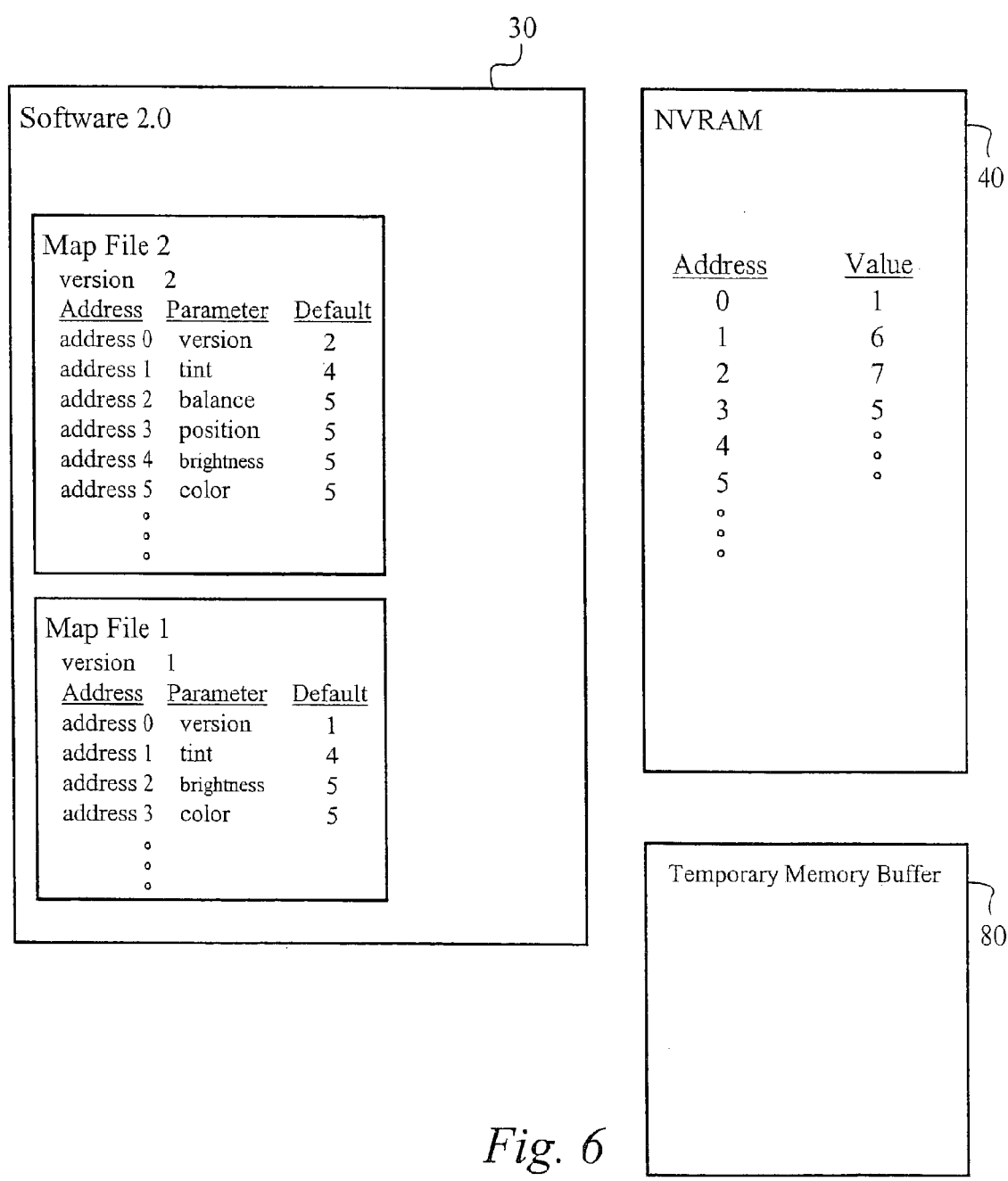
FIG. 6 illustrates the system memory and the NVRAM of FIG. 5 after a software upgrade, but before the current setting parameters in FIG. 5 are accounted for in the system memory.

FIG. 6 illustrates the software within the system memory 30, including the map file 1 and the map file 2, and the NVRAM 40 of FIG. 5 after a software upgrade to version 2, but before the current setting parameter values in the NVRAM 40 are migrated to correspond to the new setting parameter values within the new map file 2. An empty temporary buffer 80 is also illustrated in FIG. 6. When the new software version 2 is loaded into the system memory 30, the map files 1 and 2 included within the software version 2 are both also included within the software in the system memory 30. The map file 2 includes the setting parameters, the corresponding address of each setting parameter in the NVRAM 40 and the setting parameter default values as defined by the new software version 2. The new setting parameters can be the same as the previous setting parameters, or the new setting parameters can include all or some of the old setting parameters and any additional setting parameters. Each map file will always include the version number setting parameter. In this example, the map file 2 includes the version number setting parameter and all of the setting parameters from software version 1, namely tint, brightness and color. The map file 2 also includes the additional setting parameters position and balance. In FIG. 6, the default setting parameter values are also included in the map file 2. Specifically, tint=4, balance=5, position=5, brightness=5, and color=5. Since the map file for each previous version is also included within the software in the system memory 30, the system memory 30 includes both the map file 1 and the map file 2.

The map file 2, associates the setting parameters and the version number parameter with the addresses of their respective values in the NVRAM 40. However, at this step, the values of the setting parameters in the map file 2 are not yet mapped to the NVRAM 40. First, the current setting parameter values stored in the NVRAM 40 for the same setting parameters in the new map file 2 are associated in the temporary memory 80. For the setting parameters for which there is no corresponding value in the NVRAM 40, then the default value from the map file 2 is associated with the setting parameter in the temporary memory 80.

Figure 7:
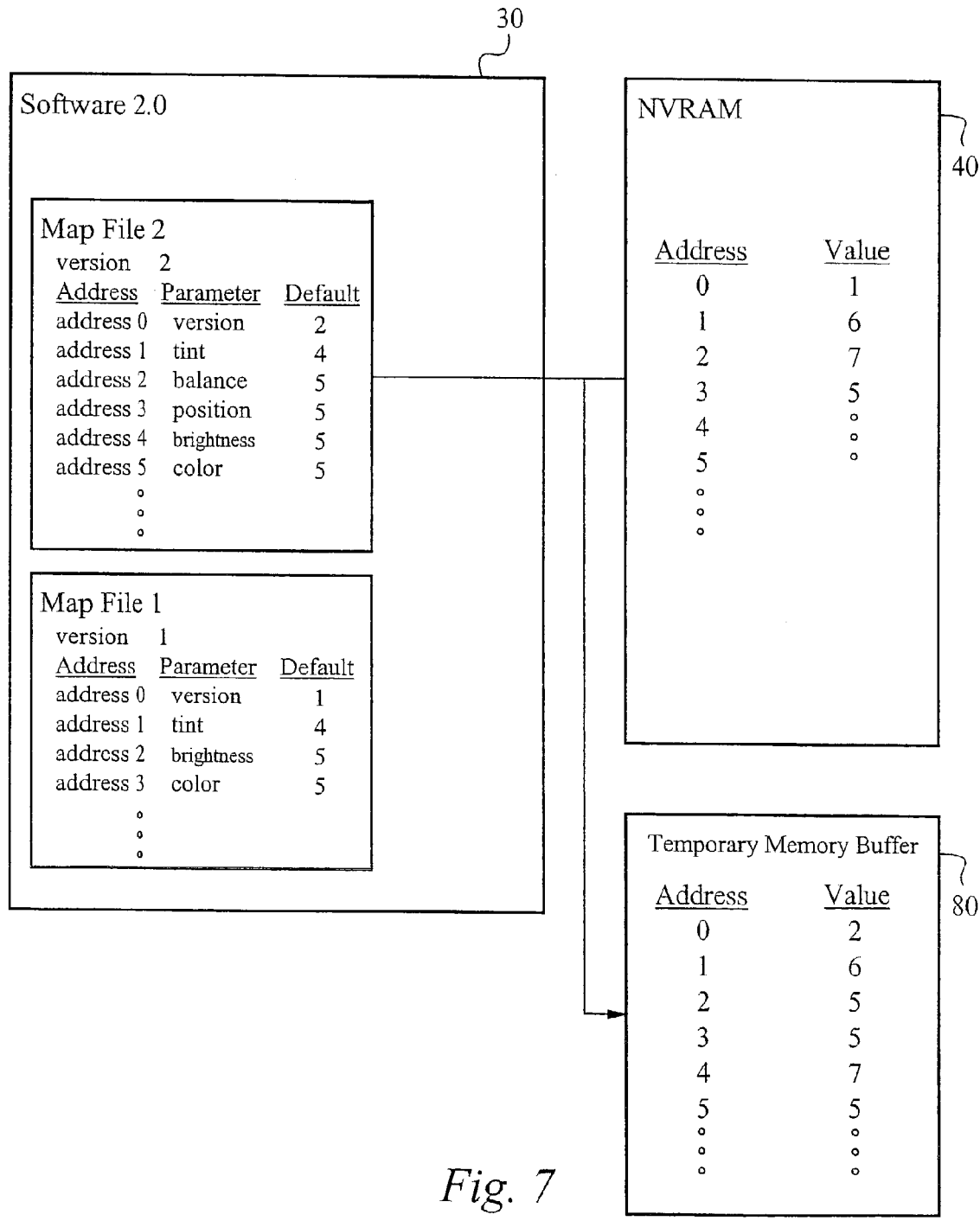
FIG. 7 illustrates the system memory and the NVRAM of FIG. 6 as the setting parameter values are loaded into a temporary memory.

FIG. 7 illustrates the system memory 30 and the NVRAM 40 of FIG. 6, as the NVRAM 40, which includes the current setting parameter values and the previous version number parameter value, is used to update the corresponding setting parameter values corresponding to the new map file 2. Specifically, in a first step, the version number parameter value is read from the NVRAM 40, which in this case is version=1 and compared to the version number in the new map file, which in this case is version=2. It is then determined that the NVRAM 40 needs to be updated to correspond to the new map file 2. Next, for each setting parameter included in the new map file 2, using the map file corresponding to the NVRAM 40, it is determined if there is a corresponding value stored in the NVRAM 40. If there is a corresponding value stored in the NVRAM 40, then that value is stored in the temporary memory buffer 80 at a location corresponding to the setting parameter in the new map file 2. If there is not a corresponding value stored in the NVRAM 40, then the default value from the new map file 2 is stored in the temporary memory buffer 80 at the location corresponding to the setting parameter in the new map file 2.

In the example of FIG. 7, for the setting parameter tint, it is determined that at the address 1 in the NVRAM 40 there is a corresponding value for this setting parameter. This corresponding value "6" is then loaded in the temporary memory buffer 80 at the address 1. For the setting parameter balance, it is determined that there is no corresponding value in the NVRAM 40 for this setting parameter. The default value "5" from the map file 2 is then loaded in the temporary memory buffer 8 at the address 2. For the setting parameter position, it is determined that there is no corresponding value in the NVRAM 40 for this setting parameter. The default value "5" from the map file 2 is then loaded in the temporary memory buffer 80 at the address 3. For the setting parameter brightness, it is determined that at the address 2 in the NVRAM 40 there is a corresponding value for this setting parameter. This corresponding value "7" is then loaded in the temporary memory buffer 80 at the address 4. For the setting parameter color, it is determined that at the address 3 in the NVRAM 40 there is a corresponding value for this setting parameter. This corresponding value "5" is then loaded in the temporary memory buffer 80 at the address 5.

Figure 8:
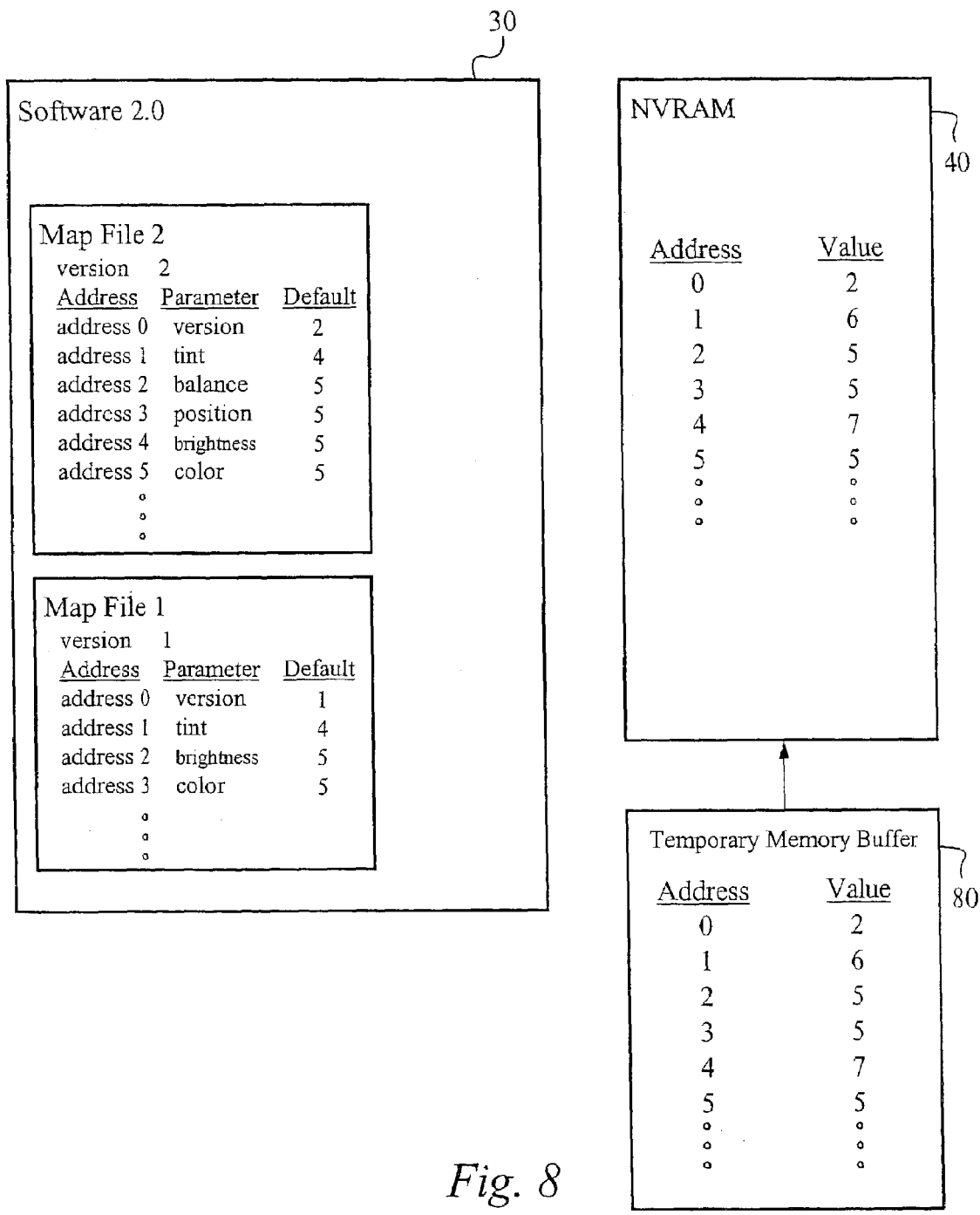
FIG. 8 illustrates the system memory, the NVRAM and the temporary memory of FIG. 7 after the NVRAM is rewritten with the updated setting parameter values and the new version number parameter value from the temporary memory.

FIG. 8 illustrates the system memory 30 and the NVRAM 40 of FIG. 7 after the NVRAM 40 is rewritten with the updated setting parameter values and the new version number parameter value from the temporary memory 80. Once all of the values from either the NVRAM 40 or the map file 2 have been loaded into the appropriate addresses in the temporary memory buffer 80, then the values from the temporary memory 80 are loaded in the appropriate addresses in the NVRAM 40. The NVRAM 40 then is updated and corresponds to the new map file 2 while preserving the settings for the setting parameters which were included in the NVRAM 40 for the previous version of the software.

Map file 2 indicates that the value of the version number parameter is located at address 0, the value of the tint parameter is located at address 1, the value of the balance parameter is located at address 2, the value of the position parameter is located at address 3, the value of the brightness parameter is located at address 4, and the value of the color parameter is located at address 5. Using the map file 2, as described above, the setting parameter values and the version number parameter value stored in the temporary memory 80 are written into the NVRAM 40. As can be seen in FIG. 8, the value stored at address 0 within the NVRAM 40 is 2, the value stored at address 1 is 6, the value stored at address 2 is 5, the value stored at the address 3 is 5, the value stored at address 4 is 7, and the value stored at address 5 is 5. The values stored in the NVRAM 40 correspond directly to the values of the version number parameter and the setting parameters in the map file 2. It is not required that the location of specific setting parameter values within the NVRAM 40 remain constant through a software upgrade. This is illustrated when comparing the address of the color parameter value, as shown in map file 1 and map file 2.

It should be clear to those skilled in the art that although the above discussion and examples of maintaining current setting parameter values through a software upgrade relates to the software initially installed at time of manufacture and the first software upgrade, the aforementioned process of the present invention can be applied between any two software version upgrades, for example, between software version 3 and 4, or between software version 2 and 5.

Software upgrades are preferably downloaded to the set-top box 10 via a network connection. The download can occur automatically anytime there is an available upgrade, or the user can initiate a download, preferably using a browser-enabled set-top box 10. Alternatively, the software upgrade can be read directly from a hard copy medium such as a floppy disk or CD-ROM.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention. Specifically, the method of migrating configuration data can be used for upgrading software other than the operating software of a set-top box.

What is claimed is:

1. A method of migrating current setting parameter values through a software upgrade, the method comprising:
    a. storing current setting parameter values and a current version number parameter value of a current software version in a non-volatile memory;
    b. loading a new software version into a system memory, wherein the new software version includes a new version number parameter value, new setting parameters, and default new setting parameter values;
    c. for each of the new setting parameters, storing in the non-volatile memory, the current setting parameter value, if available; and
    d. for each of the new setting parameters for which a current setting parameter value is not available, storing a corresponding default new setting parameter value in the non-volatile memory.

2. The method according to claim 1 wherein the system memory includes a map file which includes setting parameters, setting parameter values, version number parameter, and version number parameter value.

3. The method according to claim 2 further comprising generating and storing the map file based on a layout file such that the map file is identified by the version number parameter value in the layout file, wherein the map file includes each setting parameter stored in the layout file and an associated address within the non-volatile memory in which the corresponding setting parameter value is located.

4. The method according to claim 1 further comprising comparing the new version number parameter value and the current version number parameter value to determine which version number parameter value is higher.

5. The method according to claim 4 wherein if the new version number parameter value is greater than the current version number parameter value, then the method further comprises identifying the map file corresponding to the current version number parameter value stored in the non-volatile memory, and associating the setting parameters within the identified map file with the corresponding setting parameter values stored in the non-volatile memory according to the identified map file.

6. The method according to claim 1 further comprising for each of the new setting parameters, storing in a temporary memory, the current setting parameter value, if available, or the corresponding default new setting parameter value.

7. The method according to claim 1 further comprising determining if the new version number parameter value is higher than the current version number parameter value.

8. The method according to claim 7 wherein c and d are only performed if the new version number parameter value is greater than the current version number parameter value.

9. A device for migrating current setting parameter values through a software upgrade, the device comprising:
    a. means for storing current setting parameter values and a current version number parameter value of a current software version in a non-volatile memory;
    b. means for loading a new software version into a system memory, wherein the new software version includes a new version number parameter value, new setting parameters, and default new setting parameter values; and
    c. means for controlling for storing in the non-volatile memory for each of the new setting parameters, the current setting parameter value, if available, and for each of the new setting parameters for which a current setting parameter value is not available, storing a corresponding default new setting parameter value in the non-volatile memory.

10. The device according to claim 9 wherein the system memory includes a map file which includes setting parameters, setting parameter values, version number parameter, and version number parameter value.

11. The device according to claim 10 further comprising means for generating and storing the map file based on a layout file such that the map file is identified by the version number parameter value in the layout file, wherein the map file includes each setting parameter stored in the layout file and an associated address within the non-volatile memory in which the corresponding setting parameter value is located.

12. The device according to claim 9 further comprising means for comparing the new version number parameter value and the current version number parameter value to determine which version number parameter value is greater.

13. The device according to claim 12 wherein if the new version number parameter value is greater than the current version number parameter value, then the means for controlling further identifies the map file corresponding to the current version number parameter value stored in the non-volatile memory, and associates the setting parameters within the identified map file with the corresponding setting parameter values stored in the non-volatile memory according to the identified map file.

14. The device according to claim 12 wherein the means for controlling only stores the current setting parameter value or the default new setting parameter value in the non-volatile memory if the new version number parameter value is greater than the current version number parameter value.

15. The device according to claim 9 further comprising temporary means for storing coupled to the means for controlling for storing in a temporary memory, for each of the new setting parameters, the current setting parameter value, if available, or the corresponding default new setting parameter value.

16. A device including a software version, the device comprising:
    a. a system memory to store a current software version, wherein the current software version includes one or more adjustable current setting parameters, current setting parameter values, a version number parameter, and a current version number parameter value;
    b. a non-volatile memory including the current version number parameter value and the current setting parameter values loaded in the system memory; and
    c. a controller to overwrite the current software version in the system memory with a new software version, wherein the new software version includes one or more adjustable new setting parameters, default values for the new setting parameters, the version number parameter, and a new version number parameter value, and to store in the non-volatile memory for each of the new setting parameters, the current setting parameter value, if available, and for each of the new setting parameters for which a current setting parameter value is not available, storing a corresponding default new setting parameter value in the non-volatile memory.

17. The device according to claim 16 wherein each software version further comprises a new map file, wherein the new map file stores the setting parameters, the setting parameter values, the version number parameter, and the version number parameter value currently residing within the system memory.

18. The device according to claim 17 wherein the map file includes each setting parameter and an associated address within the non-volatile memory in which the corresponding setting parameter value is located.

19. The device according to claim 16 further comprising an interface to receive the new software version and to send the new software version to the system memory.

20. The device according to claim 19 further comprising a decoder to receive secured content from an external content source via the interface, to decode the secured content, and to send the decoded content to a display device.

21. The device according to claim 20 wherein the content is audio, video and image data.

22. The device according to claim 16 wherein the device comprises a set-top box.

23. The device according to claim 16 wherein the system memory comprises flash memory.

24. The device according to claim 16 wherein the non-volatile memory comprises non-volatile random access memory.

25. A method of migrating current setting parameter values through a software upgrade, the method comprising:
  a. storing current setting parameter values and a current version number parameter value of a current software version in a non-volatile memory;
  b. loading a new software version into a system memory, wherein the new software version includes a new version number parameter value, new setting parameters, and default new setting parameter values;
  c. for each of the new setting parameters, storing in a temporary memory, the current setting parameter value, if available;
  d. for each of the new setting parameters for which a current setting parameter value is not available, storing a corresponding default new setting parameter value in the temporary memory; and
  e. storing the current setting parameter values and the default new setting parameter values from the temporary memory in the non-volatile memory.

26. The method according to claim 25 wherein the system memory includes a map file which includes setting parameters, setting parameter values, version number parameter and version number parameter value.

27. The method according to claim 26 further comprising generating and storing the map file based on a layout file such that the map file is identified by the version number parameter value in the layout file, wherein the map file includes each setting parameter stored in the layout file and an associated address within the non-volatile memory in which the corresponding setting parameter value is located.

28. The method according to claim 25 further comprising comparing the new version number parameter value and the current version number parameter value to determine which version number parameter is higher.

29. The method according to claim 28 wherein if the new version number parameter value is greater than the current version number parameter value, then the method further comprises identifying the map file corresponding to the current version number parameter value stored in the non-volatile memory, and associating the setting parameters within the identified map file with the corresponding setting parameter values stored in the non-volatile memory according to the identified map file.

30. A device to migrate current setting parameter values through a software upgrade, the device comprising:
  a. a non-volatile memory to store current setting parameter values and a current version number parameter value of a current software version;
  b. an upgrade interface to load a new software version into a system memory, wherein the new software version includes a new version number parameter value, new setting parameters and default new setting parameter values; and
  c. a control circuit to store in the non-volatile memory for each of the new setting parameters, the current setting parameter value, if available, and for each of the new setting parameters for which a current setting parameter value is not available, to store a corresponding default new setting parameter value in the non-volatile memory.

31. The device according to claim 30 wherein the system memory includes a map file which includes setting parameters, setting parameter values, version number parameter and version number parameter value.

32. The device according to claim 31 further comprising a generation circuit to generate and store the map file based on a layout file such that the map file is identified by the version number parameter value in the layout file, wherein the map file includes each setting parameter stored in the layout file and an associated address within the non-volatile memory in which the corresponding setting parameter value is located.

33. The device according to claim 30 further comprising a comparator circuit to compare the new version number parameter value and the current version number parameter value to determine which version number parameter value is greater.

34. The device according to claim 33 wherein if the new version number parameter value is greater than the current version number parameter value, then the control circuit further identifies the map file corresponding to the current version number parameter value stored in the non-volatile memory, and associates the setting parameters within the identified map file with the corresponding setting parameter values stored in the non-volatile memory according to the identified map file.

35. The device according to claim 33 wherein the control circuit only stores the current setting parameter value or the default new setting parameter value in the non-volatile memory if the new version number parameter value is greater than the current version number parameter value.

36. The device according to claim 30 further comprising a temporary memory coupled to the control circuit to store in the temporary memory, for each of the new setting parameters, the current setting parameter value, if available, or the corresponding default new setting parameter value.

\* \* \* \* \*